United States Patent
Fujimoto

(10) Patent No.: US 11,192,607 B2
(45) Date of Patent: Dec. 7, 2021

(54) ELECTRIC FRONT DERAILLEUR

(71) Applicant: Shimano Inc., Osaka (JP)

(72) Inventor: Naoki Fujimoto, Osaka (JP)

(73) Assignee: Shimano Inc., Osaka (JP)

( * ) Notice: Subject to any disclaimer, the term of this patent is extended or adjusted under 35 U.S.C. 154(b) by 299 days.

(21) Appl. No.: 16/426,632

(22) Filed: May 30, 2019

(65) Prior Publication Data

US 2020/0377175 A1 Dec. 3, 2020

(51) Int. Cl.
*B62M 9/132* (2010.01)
*B62M 9/136* (2010.01)
*B62M 9/135* (2010.01)

(52) U.S. Cl.
CPC ............ *B62M 9/132* (2013.01); *B62M 9/135* (2013.01); *B62M 9/136* (2013.01)

(58) Field of Classification Search
CPC ...... B62M 9/135; B62M 9/122; B62M 25/08; B62M 2025/006; B62M 9/132
USPC ...................................... 474/80, 82
See application file for complete search history.

(56) References Cited

U.S. PATENT DOCUMENTS

| | | | | |
|---|---|---|---|---|
| 6,623,389 B1 * | 9/2003 | Campagnolo | .......... | B62M 9/122 474/70 |
| 6,648,782 B2 * | 11/2003 | Valle | ...................... | B62M 9/132 474/78 |
| 6,679,797 B2 * | 1/2004 | Valle | ...................... | B62M 9/132 474/78 |
| 6,979,009 B2 * | 12/2005 | Ichida | .................... | B62M 9/132 280/238 |
| 7,291,079 B2 * | 11/2007 | Ichida | .................... | B62M 9/132 474/80 |
| 7,306,531 B2 * | 12/2007 | Ichida | .................... | B62M 9/122 474/70 |
| 7,331,890 B2 * | 2/2008 | Ichida | .................... | B62M 9/132 474/80 |
| 7,341,532 B2 * | 3/2008 | Ichida | .................... | B62M 9/132 474/70 |
| 7,442,136 B2 * | 10/2008 | Ichida | .................... | B62M 9/132 474/80 |
| 7,503,863 B2 * | 3/2009 | Ichida | .................... | B62M 9/132 474/70 |
| 7,607,526 B2 | 10/2009 | Itomi | | |
| 7,704,173 B2 * | 4/2010 | Ichida | .................... | B62M 9/132 474/82 |
| 8,002,655 B2 * | 8/2011 | Meggiolan | ............. | B62M 9/122 474/82 |
| 8,025,597 B2 * | 9/2011 | Takamoto | .............. | B62M 9/122 474/70 |

(Continued)

*Primary Examiner* — Henry Y Liu
(74) *Attorney, Agent, or Firm* — Global IP Counselors, LLP

(57) ABSTRACT

An electric front derailleur is basically provided with a base, a chain guide, a linkage and an electric motor unit. The base is configured to be mounted to a bicycle. The chain guide is configured to guide a chain. The linkage movably couples the chain guide to the base in a forward-rearward direction to move the chain guide between a retracted position and an extended position in a mounted state where the base is mounted to the bicycle. The electric motor unit is supported on the base and operatively coupled to the linkage to move the chain guide between the retracted position and the extended position. The electric motor unit is arranged at least partly closer to the bicycle than the chain guide.

20 Claims, 15 Drawing Sheets

(56) References Cited

U.S. PATENT DOCUMENTS

| | | | |
|---|---|---|---|
| 8,151,959 B2 | 4/2012 | Itomi | |
| 8,241,158 B2* | 8/2012 | Ishikawa | B62M 25/08 474/80 |
| 8,282,519 B2* | 10/2012 | Ichida | B62M 9/132 474/82 |
| 8,864,611 B2* | 10/2014 | Kuwayama | B62M 9/1344 474/80 |
| 8,888,620 B2* | 11/2014 | Emura | B62M 9/135 474/80 |
| 8,979,683 B2* | 3/2015 | Katsura | B62M 9/122 474/80 |
| 9,085,340 B1* | 7/2015 | Sala | B62M 9/132 |
| 9,381,974 B2* | 7/2016 | Katsura | B62M 9/132 |
| 9,676,446 B2* | 6/2017 | Pasqua | B62M 9/134 |
| 9,873,482 B2* | 1/2018 | Nishino | B62M 9/135 |
| 9,890,838 B2* | 2/2018 | Shipman | B62M 9/132 |
| 10,053,189 B2* | 8/2018 | Pasqua | B62M 25/08 |
| 10,086,907 B2* | 10/2018 | Tachibana | B62K 23/00 |
| 10,131,404 B2* | 11/2018 | Hara | B62M 9/1342 |
| 10,370,060 B2* | 8/2019 | Komatsu | B62M 25/08 |
| 2002/0061797 A1* | 5/2002 | Valle | B62M 25/08 474/70 |
| 2003/0027674 A1* | 2/2003 | Valle | B62M 25/08 474/70 |
| 2005/0189158 A1* | 9/2005 | Ichida | B62M 25/08 180/260 |
| 2005/0192139 A1* | 9/2005 | Ichida | B62M 25/08 474/80 |
| 2005/0197222 A1* | 9/2005 | Tatsumi | B62M 9/132 474/80 |
| 2005/0205323 A1* | 9/2005 | Ichida | B62M 9/132 474/80 |
| 2006/0189421 A1* | 8/2006 | Ichida | B62M 9/132 474/80 |
| 2007/0037645 A1* | 2/2007 | Ishikawa | B62M 9/132 474/80 |
| 2007/0184925 A1* | 8/2007 | Ichida | B62M 25/08 474/80 |
| 2013/0192405 A1* | 8/2013 | Katsura | B62M 9/132 74/473.12 |
| 2014/0087901 A1* | 3/2014 | Shipman | B62M 9/122 474/82 |
| 2014/0114538 A1* | 4/2014 | Shipman | B62M 9/132 701/51 |
| 2014/0155205 A1* | 6/2014 | Kuwayama | B62M 9/1344 474/80 |
| 2014/0243128 A1* | 8/2014 | Pasqua | B62M 9/134 474/80 |
| 2014/0287856 A1* | 9/2014 | Kuwayama | B62M 9/132 474/80 |
| 2015/0353166 A1* | 12/2015 | Kuwayama | B62M 9/132 474/82 |
| 2017/0101155 A1* | 4/2017 | Tachibana | H04W 4/70 |
| 2017/0101162 A1* | 4/2017 | Tachibana | B62M 25/08 |
| 2017/0120983 A1* | 5/2017 | Komatsu | B62K 25/286 |
| 2017/0175825 A1 | 6/2017 | Itomi | |
| 2017/0247082 A1* | 8/2017 | Katsura | B62M 9/132 |
| 2017/0334519 A1* | 11/2017 | Sala | B62M 9/134 |
| 2018/0001960 A1* | 1/2018 | Pasqua | B62M 25/08 |
| 2018/0347643 A1 | 12/2018 | Itomi | |
| 2020/0156737 A1* | 5/2020 | Liao | B62M 9/1342 |
| 2020/0298934 A1* | 9/2020 | Wu | B62J 43/30 |

* cited by examiner

ELECTRIC FRONT DERAILLEUR

BACKGROUND

Technical Field

The present invention generally relates to an electric front derailleur. More specifically, the present invention relates to an electric front derailleur having a chain guide that is movable between a retracted position and an extended position to move a bicycle chain between front sprockets.

Background Information

Many bicycles are provided with a drivetrain that allows the rider to change a gear ratio for transferring power from the pedals to the rear wheel. Often the drivetrain uses one or more derailleurs to change the gear ratio. A front derailleur is mounted to the bicycle frame adjacent to front sprockets to shift a chain laterally between the front sprockets, while a rear derailleur is mounted adjacent to a hub of the rear wheel to shift the chain laterally between rear sprockets. In either case, the derailleur typically includes a fixed member or base that is non-movably secured to the bicycle frame, and a chain guide. The chain guide is movably supported relative to the base to move between at least two lateral shift positions. Typically, a linkage assembly is coupled between the base and the chain guide in order to movably support the chain guide with base.

SUMMARY

Generally, the present disclosure is directed to various features of an electric front derailleur.

In view of the state of the known technology and in accordance with a first aspect of the present disclosure, an electric front derailleur is provided that basically comprises a base, a chain guide, a linkage and an electric motor unit. The base is configured to be mounted to a bicycle. The chain guide is configured to guide a chain. The linkage movably couples the chain guide to the base in a forward-rearward direction to move the chain guide between a retracted position and an extended position in a mounted state where the base is mounted to the bicycle. The electric motor unit is supported on the base and operatively coupled to the linkage to move the chain guide between the retracted position and the extended position. The electric motor unit is arranged at least partly closer to a bicycle frame of the bicycle than the chain guide.

With the electric front derailleur according to the first aspect, it is possible to improve design freedom in the layout of the electric motor unit with respect to the other parts of the electric front derailleur.

In accordance with a second aspect of the present disclosure, an electric front derailleur is provided that basically comprises a base, a chain guide, a linkage and an electric motor unit. The base is configured to be mounted to a bicycle. The guide includes an inner guide plate and an outer guide plate. The inner guide plate and the outer guide plate are arranged along a guiding direction. The linkage movably couples the chain guide to the base to move the chain guide between a retracted position and an extended position. The electric motor unit is supported on the base and operatively coupled to the linkage to move the chain guide between the retracted position and the extended position. The electric motor unit is arranged so as to at least partly overlap with the chain guide while the chain guide is in the retracted position as viewed in the guiding direction.

With the electric front derailleur according to the second aspect, it is possible to lower the position of the electric motor unit to overlap with the chain guide while the chain guide is in the retracted position.

In accordance with a third aspect of the present disclosure, the electric front derailleur according to the second aspect is configured so that the linkage is configured to move the chain guide in a forward-rearward direction with respect to the base in a mounted state where the base is mounted to the bicycle in a mounted state.

With the electric front derailleur according to the third aspect, it is possible to maintain the height of the chain guide as the chain guide moves horizontally between the retracted position and the extended position.

In accordance with a fourth aspect of the present disclosure, the electric front derailleur according to any one of the first to third aspects is configured so that the electric motor unit is at least partly arranged between the chain guide and the bicycle as seen in a direction perpendicular to the guiding direction.

With the electric front derailleur according to the fourth aspect, it is possible to decrease an overall height of the electric front derailleur as compared to conventional electric front derailleurs.

In accordance with a fifth aspect of the present disclosure, the electric front derailleur according to any one of the first to fourth aspects is configured so that the base includes a bicycle mounting structure at least partly located above the electric motor unit in the mounted state.

With the electric front derailleur according to the fifth aspect, it is possible to stably mount the electric front derailleur to the bicycle.

In accordance with a sixth aspect of the present disclosure, the electric front derailleur according to any one of the first to fourth aspects is configured so that the base includes a bicycle mounting structure, and the electric motor unit includes a motor unit housing supported on the base such that the motor unit housing is at least partly located frontward of the bicycle mounting structure in the mounted state.

With the electric front derailleur according to the sixth aspect, it is possible to stably mount the electric front derailleur to the bicycle.

In accordance with a seventh aspect of the present disclosure, the electric front derailleur according to any one of the first to fifth aspects is configured so that the electric motor unit includes a motor unit housing that is supported on the base, and the chain guide includes an inner guide plate and an outer guide plate, the inner guide plate has an opening that receives a portion of the motor unit housing while the chain guide is in the retracted position.

With the electric front derailleur according to the seventh aspect, it is possible to reduce an overall lateral width of the electric front derailleur.

In accordance with an eighth aspect of the present disclosure, the electric front derailleur according to any one of the first to seventh aspects is configured so that the electric motor unit includes an electric motor, and the linkage includes a first link pivotally connected to the base around a first pivot axle and pivotally connected to the chain guide around a second pivot axle, the first pivot axle is fixedly coupled to the first link and operatively connected to the electric motor to directly rotate the first link in response to operation of the electric motor.

With the electric front derailleur according to the eighth aspect, it is possible to avoid the use of additional members to transmit the output rotation of the motor to move the chain guide.

In accordance with a ninth aspect of the present disclosure, the electric front derailleur according to the eighth aspect is configured so that the base has a first base support that includes a first base pivot opening receiving the first pivot axle and a second base support that includes a second base pivot opening receiving the first pivot axle. The first link has a first link support that includes a first opening receiving the first pivot axle. The second link support that includes a second opening receiving the first pivot axle. The first base support is located above the first link support. The second base support is located above the second link support in the mounted state.

With the electric front derailleur according to the ninth aspect, it is possible to easily and stably mount the first link to the base.

In accordance with a tenth aspect of the present disclosure, the electric front derailleur according to the eighth or ninth aspect is configured so that the linkage includes a second link pivotally connected to the base around a third pivot axle and pivotally connected to the chain guide around a fourth pivot axle.

With the electric front derailleur according to the tenth aspect, it is possible to efficiently and stably move the chain guide.

In accordance with an eleventh aspect of the present disclosure, the electric front derailleur according to the tenth aspect is configured so that the base has a third base support that includes a third base pivot opening receiving the third pivot axle and a fourth base support that includes a fourth base pivot opening receiving the third pivot axle. The second link has a third link support that includes a third receiving the third pivot axle and a fourth link support that includes a fourth opening receiving the third pivot axle. The third link support is located above the third base support. The fourth link support is located above the fourth base support in the mounted state.

With the electric front derailleur according to the eleventh aspect, it is possible to easily and stably mount the second link to the base.

In accordance with a twelfth aspect of the present disclosure, the electric front derailleur according to the tenth aspect is configured so that the first pivot axle is located rearward of the third pivot axle in the mounted state as view in a direction parallel to a pivot axis of the first pivot axle.

With the electric front derailleur according to the twelfth aspect, it is possible to move the chain guide forward and outward with respect to the bicycle as the chain guide moves horizontally from the retracted position to the extended position.

In accordance with a thirteenth aspect of the present disclosure, the electric front derailleur according to any one of the tenth to twelfth aspects is configured so that the second pivot axle is located rearward of the fourth pivot axle in the mounted state as view in a direction parallel to a pivot axis of the second pivot axle.

With the electric front derailleur according to the thirteenth aspect, it is possible to move the chain guide forward and outward with respect to the bicycle as the chain guide moves horizontally from the retracted position to the extended position.

In accordance with a fourteenth aspect of the present disclosure, the electric front derailleur according to any one of the tenth to thirteenth aspects is configured so that the fourth pivot axle is located forward of the first pivot axle in the mounted state as view in a direction parallel to a pivot axis of the fourth pivot axle.

With the electric front derailleur according to the fourteenth aspect, it is possible to move the chain guide forward and outward with respect to the bicycle as the chain guide moves horizontally from the retracted position to the extended position.

In accordance with a fifteenth aspect of the present disclosure, the electric front derailleur according to any one of the eighth to fourteenth aspects further comprises an anti-reverse input clutch operatively disposed between an output shaft of the electric motor and the first pivot axle.

With the electric front derailleur according to the fifteenth aspect, it is possible to protect the motor unit if the chain guide gets jammed or stuck during operation of the electric motor unit.

In accordance with a sixteenth aspect of the present disclosure, the electric front derailleur according to any one of the eighth to fifteenth aspects further comprises a gear reduction drivetrain operatively coupling the electric motor to the first pivot axle.

With the electric front derailleur according to the sixteenth aspect, it is possible to reduce an output speed of the electric motor unit and increase torque from the electric motor unit to move the chain guide.

In accordance with a seventeenth aspect of the present disclosure, the electric front derailleur according to any one of the first to sixteenth aspects is configured so that further comprises an indicator configured to indicate a status of the electric motor unit.

With the electric front derailleur according to the seventeenth aspect, it is possible to easily determine the status of the electric motor unit.

In accordance with an eighteenth aspect of the present disclosure, the electric front derailleur according to any one of the first to seventeenth aspects further comprises a manual switch operatively connected to the electric motor unit to drive the electric motor unit.

With the electric front derailleur according to the eighteenth aspect, it is possible to manually operate the electric motor unit without using a user input device.

In accordance with a nineteenth aspect of the present disclosure, the electric front derailleur according to any one of the first to eighteenth aspects further comprises a wireless communicator operatively connected to the electric motor unit.

With the electric front derailleur according to the nineteenth aspect, it is possible to easily operate the electric motor unit without the need of routing a wire between a user input device and the electric front derailleur.

In accordance with a twentieth aspect of the present disclosure, the electric front derailleur according to any one of the first to nineteenth aspects is configured so that the electric motor unit includes an electrical port configured to be coupled to other devices.

With the electric front derailleur according to the twentieth aspect, it is possible to connect the electric front derailleur to other devices or components such as a rear derailleur.

Also, other objects, features, aspects and advantages of the disclosed electric front derailleur will become apparent to those skilled in the art from the following detailed description, which, taken in conjunction with the annexed drawings, discloses a preferred embodiment of the electric front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
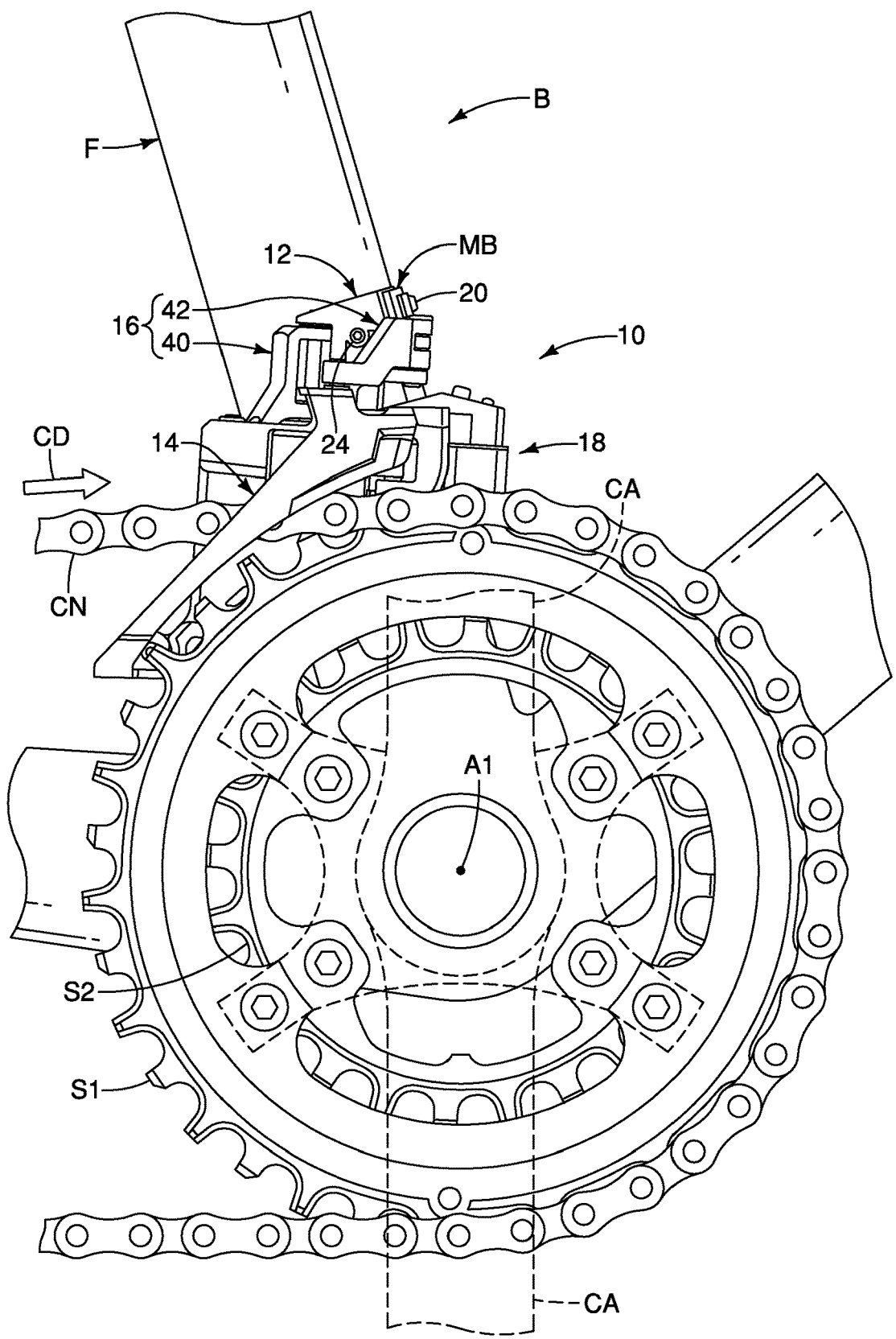
FIG. 1 is a partial side elevational view of a portion of a bicycle frame having a bicycle drive train assembly that includes an electric front derailleur with a chain guide for shifting a bicycle chain between first and second sprockets in accordance with one illustrated embodiment.

Referring initially to FIG. 1, a portion of a bicycle B is illustrated that is equipped with an electric front derailleur 10 in accordance with an exemplary embodiment. As will be explained later, the electric front derailleur 10 is a side swing electric front derailleur. The electric front derailleur 10 is configured to guide a bicycle chain CN between first and second front sprockets S1 and S2 in response to a shifting operation. The first and second front sprockets S1 and S2 are rotated by a pair of crank arms CA to rotate about a rotational center (crank) axis A1 with respect to a bicycle frame F of the bicycle B. Rotation of the first and second front sprockets S1 and S2 causes the chain to move in a chain driving direction CD. The first front sprocket S1 is a larger front sprocket with respect to the second front sprocket S2, which is an adjacent smaller front sprocket with respect to the first front sprocket S1. While the bicycle drive train assembly 10 is illustrated with only two front sprockets, it will be apparent to those skilled in the bicycle field from this disclosure that the bicycle B can include more than two front sprockets if needed and/or desired.

Basically, the electric front derailleur 10 is configured to laterally shift the bicycle chain CN between the first and second front sprockets S1 and S2 during a shifting operation. In the exemplary embodiment, as seen in FIG. 1, the electric front derailleur 10 is mounted on a mounting bracket MB of the bicycle frame F. Here, the electric front derailleur 10 is mounted to a seat tube of the bicycle frame F. However, it will be apparent to those skilled in the bicycle field from this disclosure that the electric front derailleur 10 can be attached to the bicycle B, specifically the bicycle frame F in any conventional manner, as needed and/or desired.

Referring primarily now to FIGS. 2 to 10, the electric front derailleur 10 will now be described in more detail. The electric front derailleur 10 comprises a base 12, a chain guide 14, a linkage 16 and an electric motor unit 18. Basically, in the exemplary embodiment, the base 12 is configured to be fixedly coupled to the bicycle B, such as to the bicycle frame F, in a conventional manner. The chain guide 14 is configured to guide the chain CN. The chain guide 14 is movably mounted to the base 12 by the linkage 16. The linkage 16 movably couples the chain guide 14 to the base 12 to move the chain guide 14 between a retracted position (see FIGS. 6 to 8) and an extended position (see FIGS. 2 to 5). The electric motor unit 18 is operatively connected to the linkage 16 to move the linkage 16 which in turn moves the chain guide 14. More specifically, the electric motor unit 18 is supported on the base 12 and operatively coupled to the linkage 16 to move the chain guide 14 between the retracted position and the extended position. As seen in FIGS. 3 to 8, the chain guide 14 is positioned farther from the base 12 in the extended position (see FIGS. 2 to 5) than in the retracted position (see FIGS. 6 to 8) with respect to an axial direction parallel to the rotational center axis A1 (see FIG. 1).

The base 12 is a rigid member that is made of a suitable rigid material, such as a metallic material or a plastic reinforced material. As seen in FIGS. 2 to 4, 6 and 7, the base 12 is configured to be mounted to the bicycle B. In particular, the base 12 is mounted to the mounting bracket MB of the bicycle B by a fixing bolt 20. More specifically, the base 12 includes a bicycle mounting structure 22.

Figure 2:
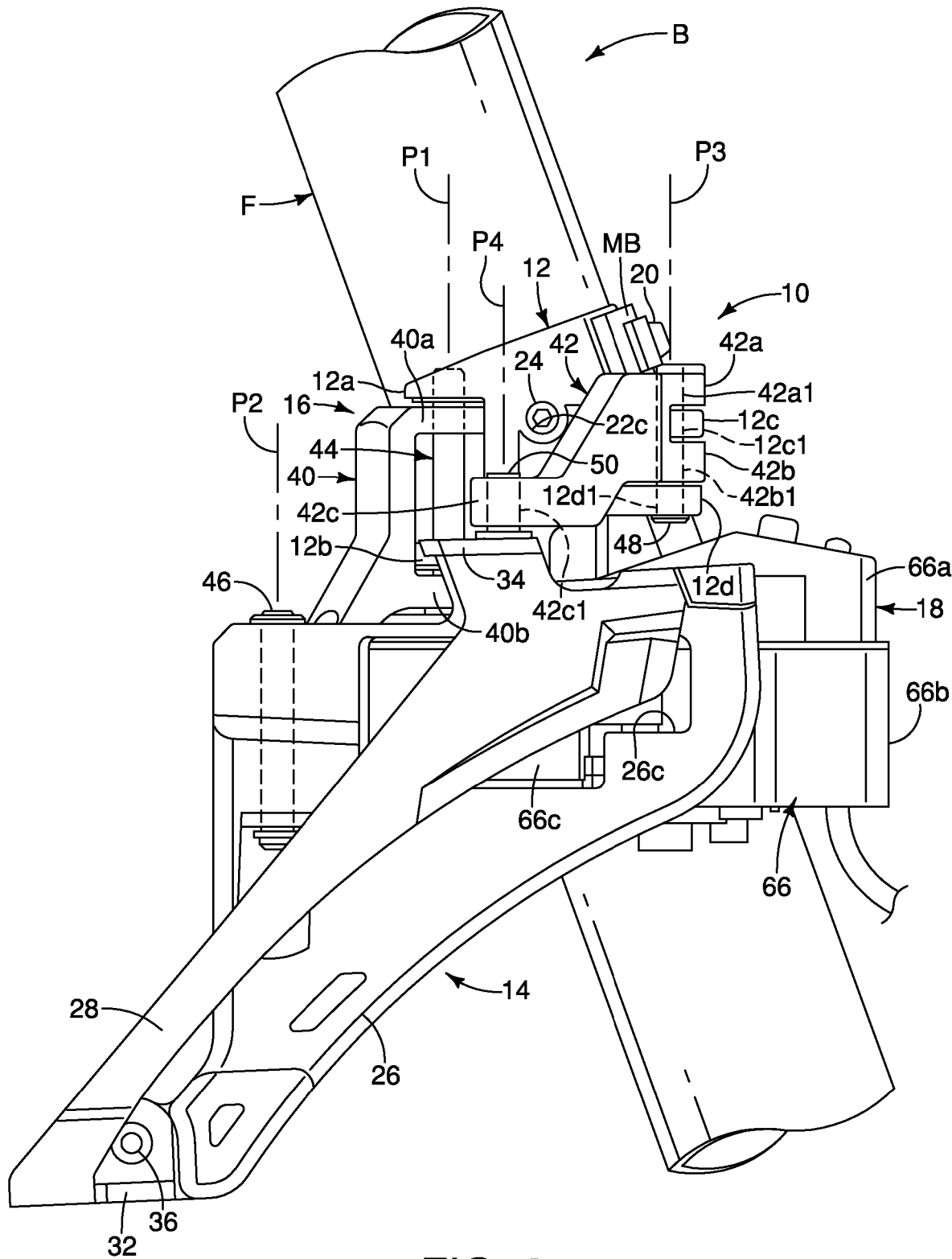
FIG. 2 is an enlarged outer side elevational view of the electric front derailleur illustrated in FIG. 1.
Figure 3:
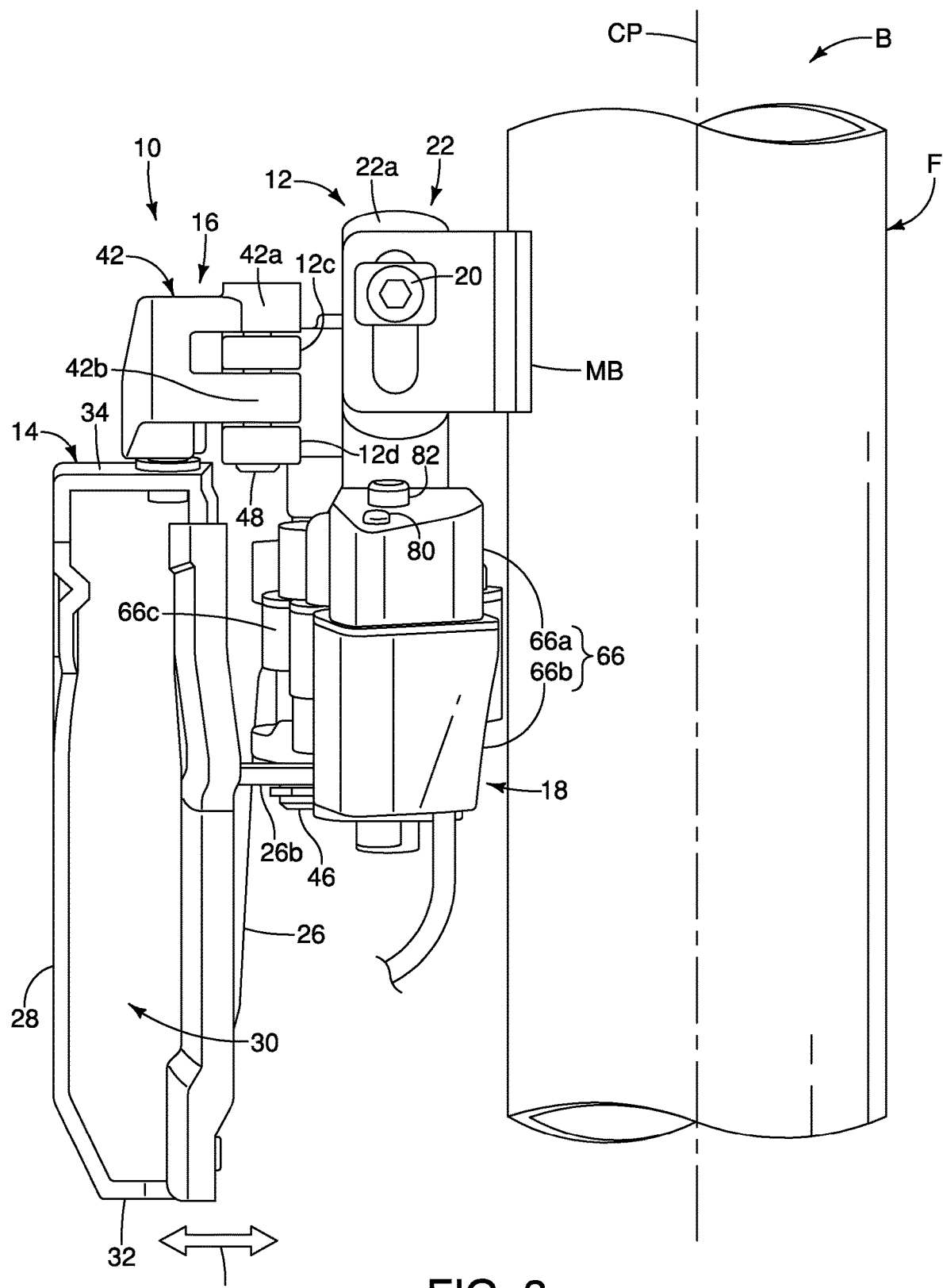
FIG. 3 is an enlarged front elevational view of the electric front derailleur illustrated in FIGS. 1 and 2 showing the chain guide in an extended position with respect to the base.
Figure 4:
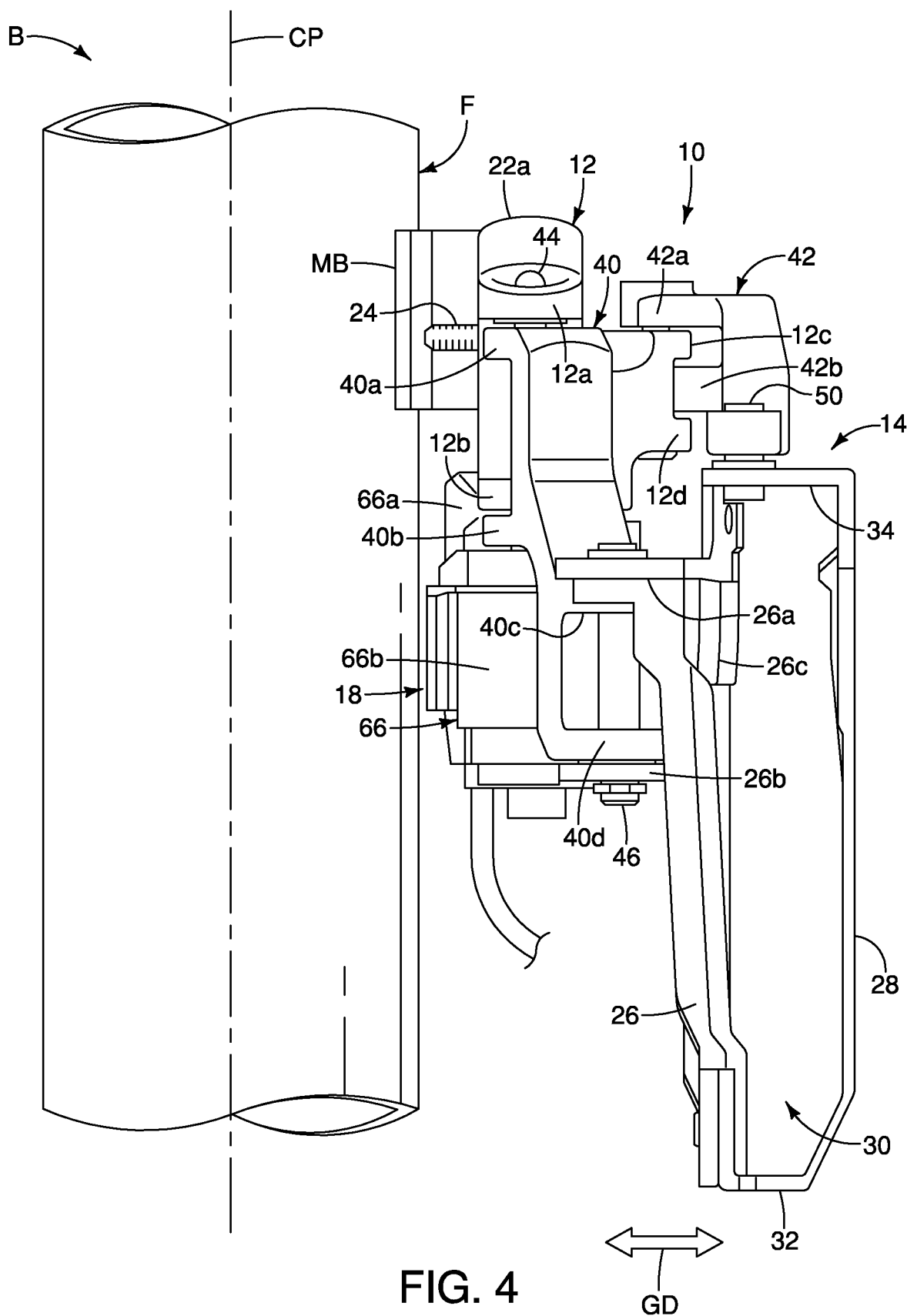
FIG. 4 is an enlarged rear elevational view of the electric front derailleur illustrated in FIGS. 1 to 3 showing the chain guide in the extended position with respect to the base.
Figure 5:
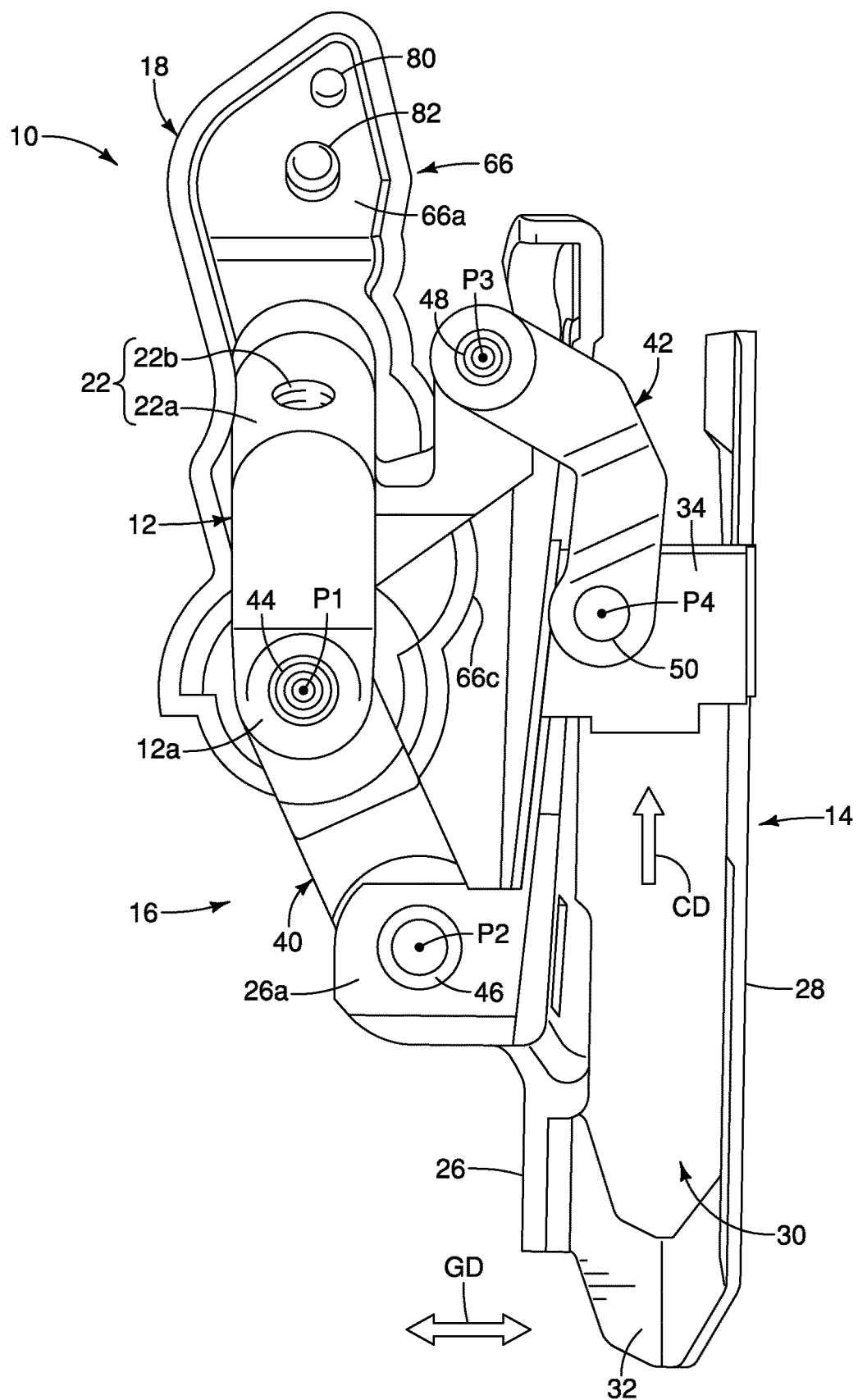
FIG. 5 is an enlarged top view of the electric front derailleur illustrated in FIGS. 1 to 4 but with the chain guide in the extended position with respect to the base.
Figure 6:
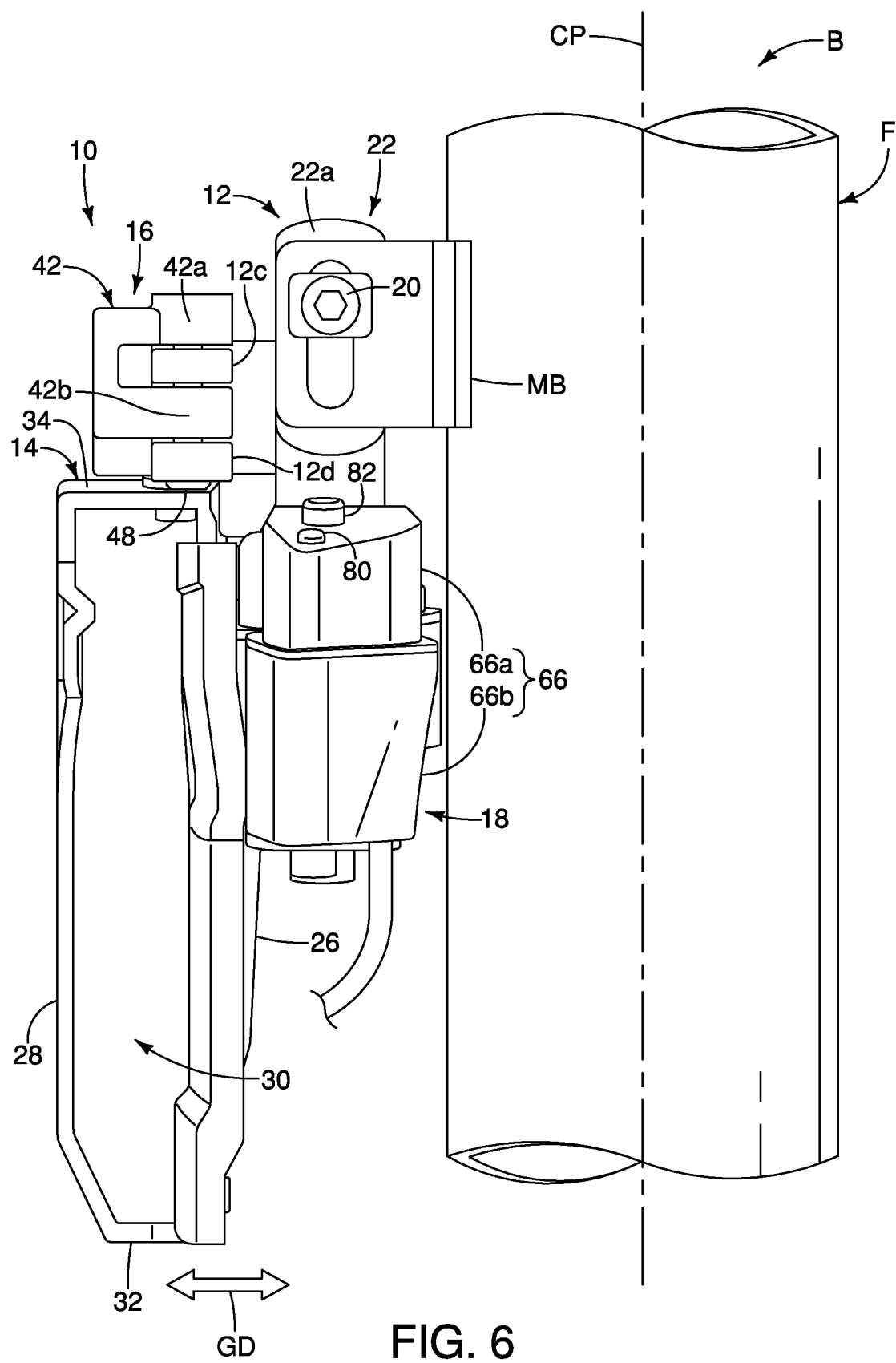
FIG. 6 is an enlarged front elevational view of the electric front derailleur illustrated in FIGS. 1 to 5 but with the chain guide in a retracted position with respect to the base.
Figure 8:
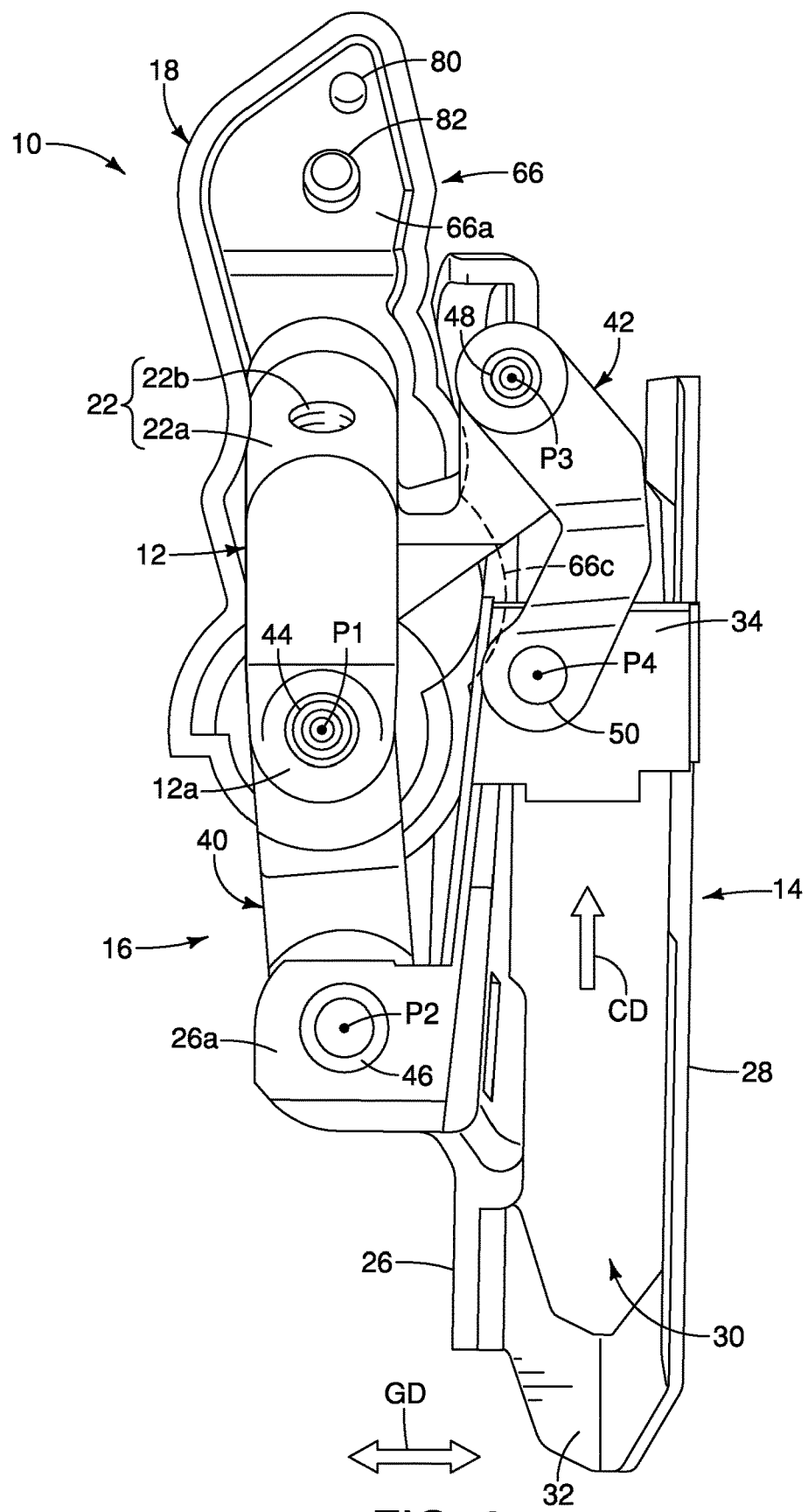
FIG. 8 is an enlarged top view of the electric front derailleur illustrated in FIGS. 1 to 7 but with the chain guide in the retracted position with respect to the base.
Figure 9:
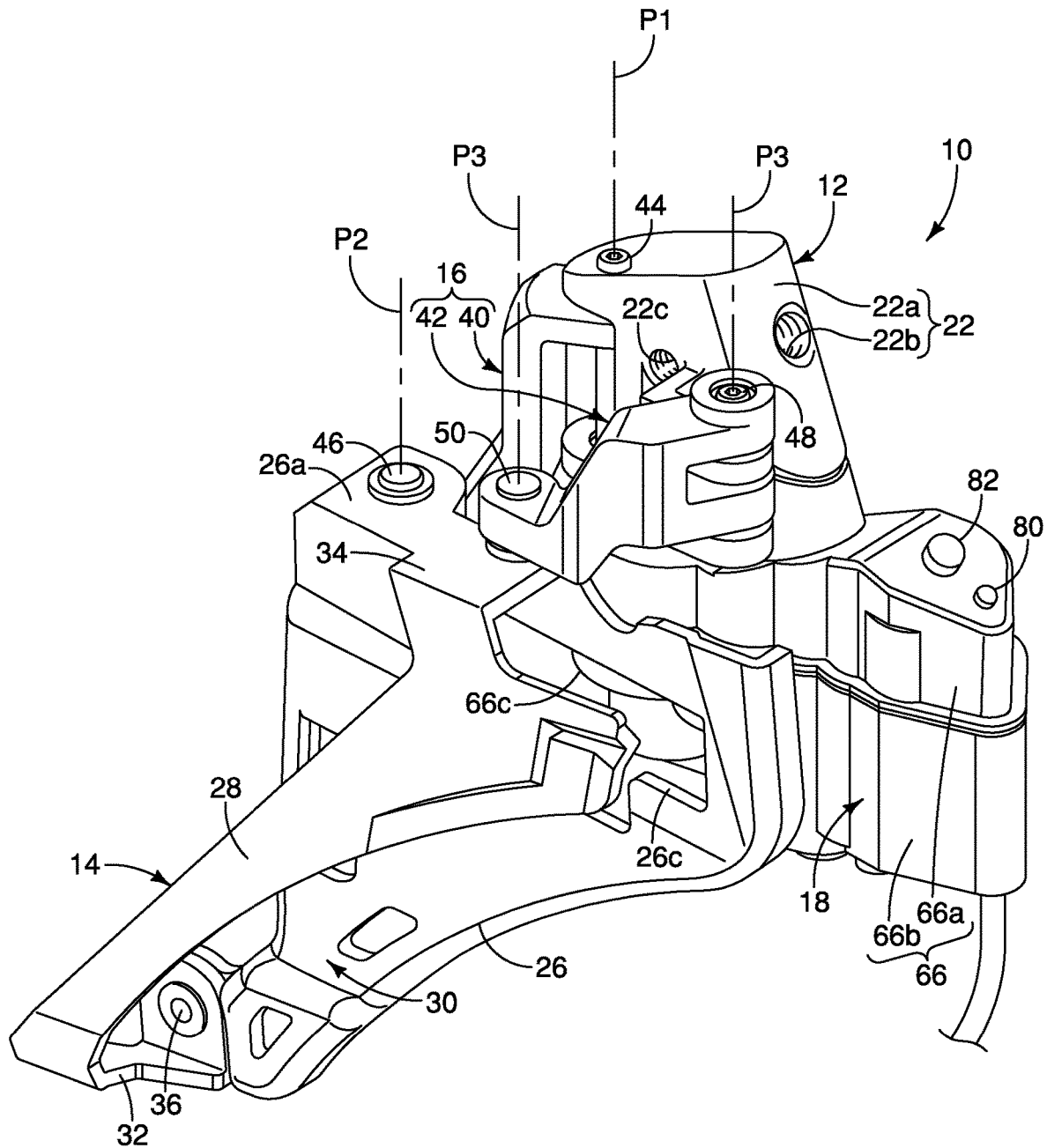
FIG. 9 is an enlarged outer side perspective view of the electric front derailleur illustrated in FIGS. 1 to 8.

Preferably, as in the exemplary embodiment, the bicycle mounting structure 22 is located above the chain guide 14. As seen in FIGS. 5, 8 and 9, the bicycle mounting structure 22 has a curved mounting surface 22a that has a threaded mounting bore 22b. As seen in FIGS. 3 and 6, the fixing bolt 20 is screwed into the threaded mounting bore 22b to fix the base 12 to the mounting bracket MB of the bicycle B. As seen in FIG. 9, the bicycle mounting structure 22 is also provided with a threaded adjustment bore 22c. As seen in FIG. 2, the threaded adjustment bore 22c threadedly receives an adjustment screw 24. The adjustment screw 24 contacts the mounting bracket MB or a part of the bicycle frame F to adjust an angle of the electric front derailleur 10 with respect to a vertical center plane CP of the bicycle B and to support the electric front derailleur 10 with respect to the bicycle B.

The base 12 has a first base support 12a and a second base support 12b for supporting the linkage 16 on the base 12 at a first location. The base 12 further has a third base support 12c and a fourth base support 12d for supporting the linkage 16 on the base 12 at a second location forward of the first location. As explained below, the linkage 16 is pivotally supported on the base 12 by the first base support 12a, the second base support 12b, the third base support 12c and the fourth base support 12d.

Now, the chain guide 14 will be discussed in more detail. The chain guide 14 is a rigid member that is made of a suitable rigid material, such as a metallic material or a plastic reinforced material. As shown in FIGS. 2 to 9, the chain guide 14 basically includes an inner guide plate 26 and an outer guide plate 28. The inner guide plate 26 and the outer guide plate 28 are configured to form a chain guiding slot 30 therebetween, as seen in FIGS. 3 to 6. In other words, the inner surfaces of the inner and outer guide plates 26 and 28 face each other to form the chain guiding slot 30 therebetween for receiving the bicycle chain CN. The inner guide plate 26 and the outer guide plate 28 are arranged along a guiding direction GD. The guiding direction GD is perpendicular or at least substantially (±5° from) perpendicular to the chain driving direction CD. The guiding direction GD is parallel or at least substantially (±5° from) parallel to the rotational center axis A1 (see FIG. 1). The chain guide 14 is configured to guide the chain CN. In particular, during a shifting operation, the chain guide 14 guides the chain CN along the guiding direction GD to shift between the first and second front sprockets S1 and S2.

In the exemplary embodiment, the chain guide 14 further includes an upstream connecting part 32 and a downstream connecting part 34. The terms "upstream" and "downstream" as used herein mean with respect to a chain driving direction CD (FIG. 1) of the bicycle chain CN inside the chain guiding slot 30 during a forward pedaling action being applied to the first and second sprockets S1 and S2. The upstream connecting part 32 connects upstream ends of the inner and outer guide plates 26 and 28. The downstream connecting part 34 connects downstream ends of the inner and outer guide plates 26 and 28. Here, the inner and outer guide plates 26 and 28 and the upstream and downstream connecting parts 32 and 34 are formed by stamping and bending a single metal sheet, and then connecting the upstream connecting part 32 to the inner guide plate 26 by a fastener 36 (e.g., a rivet or a screw).

Now, the linkage 16 will be discussed in more detail. Here, the linkage 16 is configured to move the chain guide 14 in a forward-rearward direction with respect to the base 12 in a mounted state where the base 12 is mounted to the bicycle B in a mounted state. Basically, the linkage 16 includes a first link 40 that is pivotally connected to the base 12 and pivotally connected to the chain guide 14. The first link 40 is a rigid member that is made of a suitable rigid material, such as a metallic material or a plastic reinforced material. Preferably, the linkage 16 further includes a second link 42 that is pivotally connected to the base 12 and pivotally connected to the chain guide 14. The second link 42 is a rigid member that is made of a suitable rigid material, such as a metallic material or a plastic reinforced material.

Figure 10:
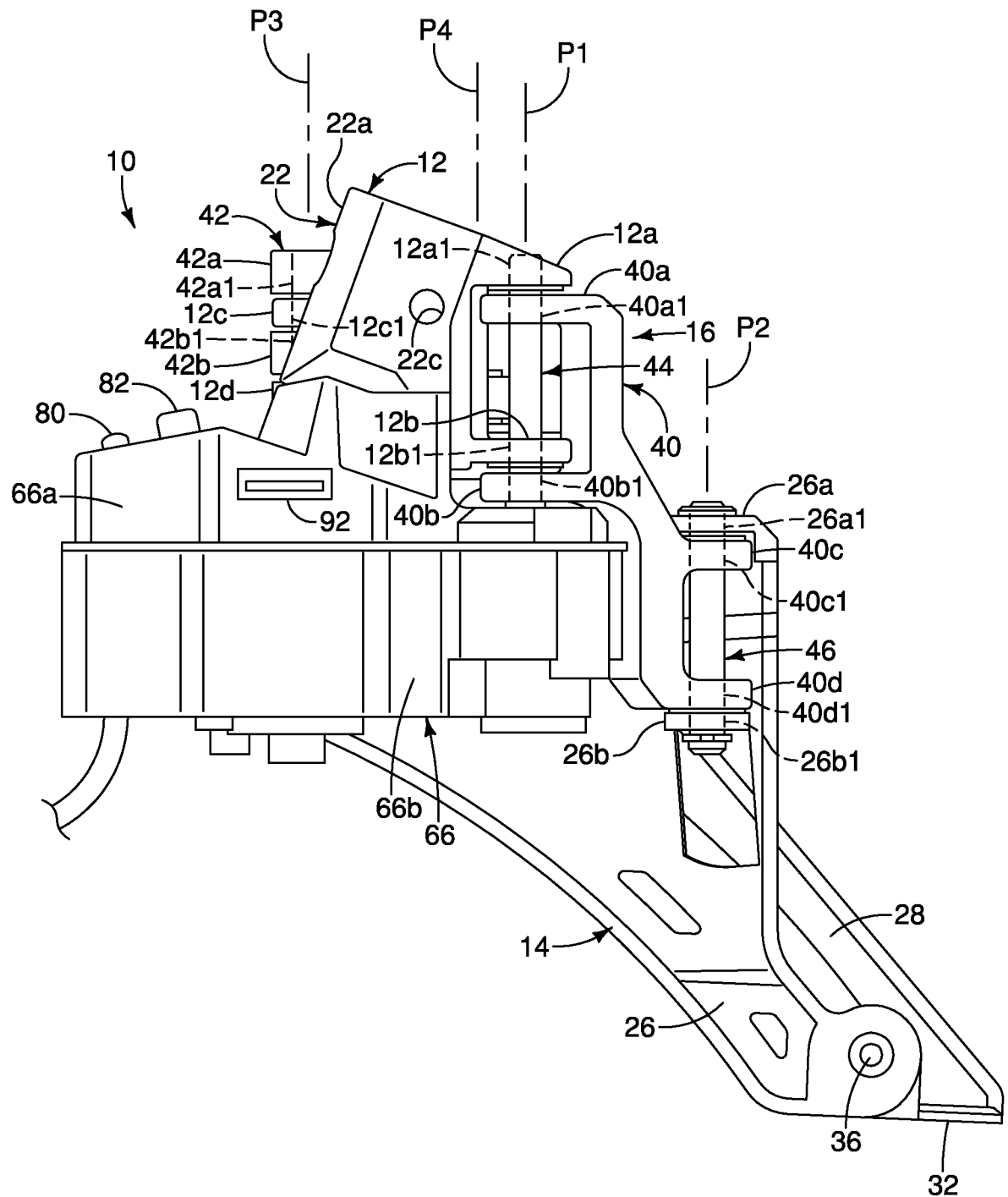
FIG. 10 is an enlarged inner side elevational view of the electric front derailleur illustrated in FIGS. 1 to 9.
Figure 11:
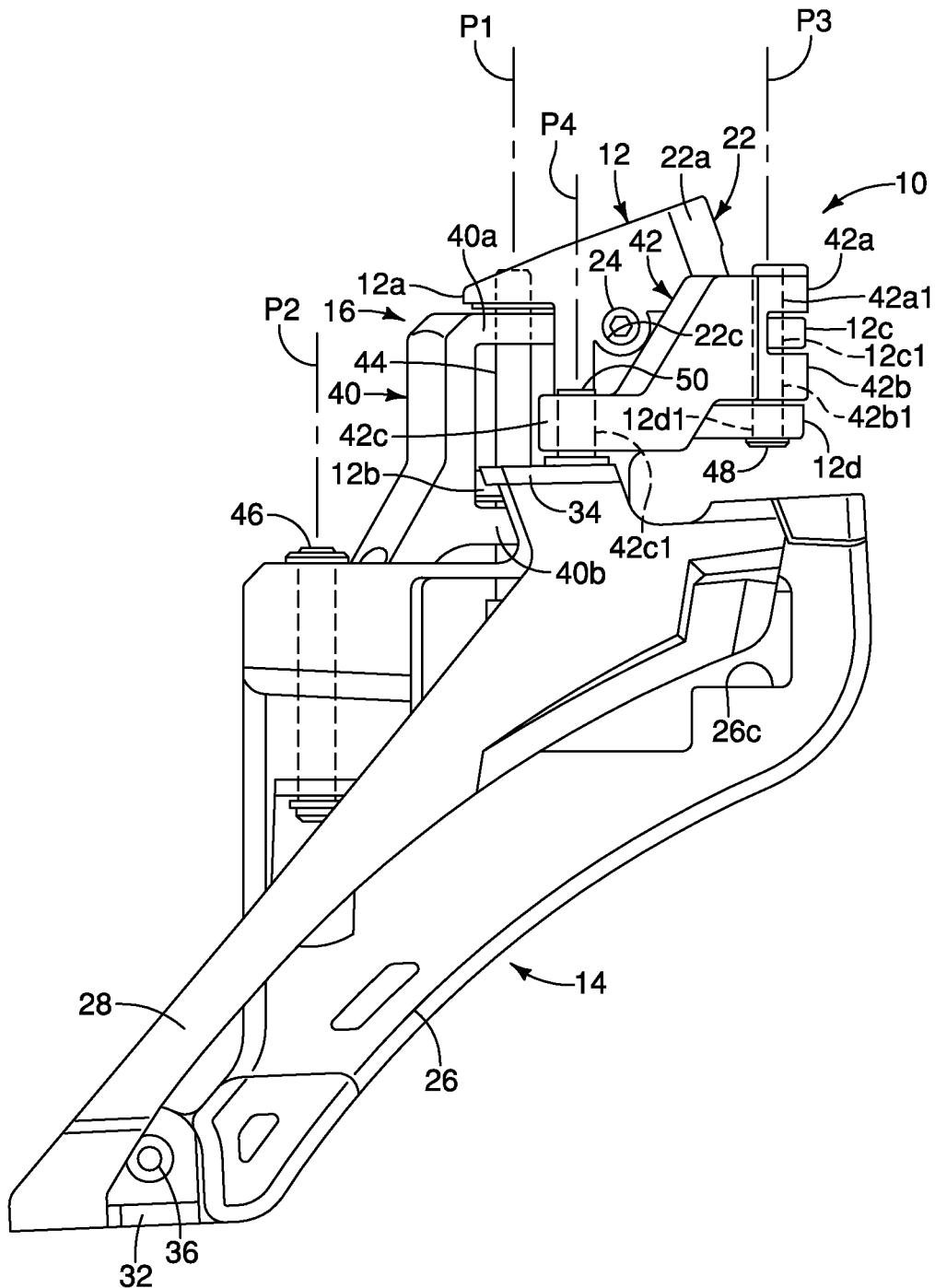
FIG. 11 is an enlarged outer side elevational view of the electric front derailleur illustrated in FIGS. 1 to 10, but with the electric motor unit removed for purposes of illustration.
Figure 12:
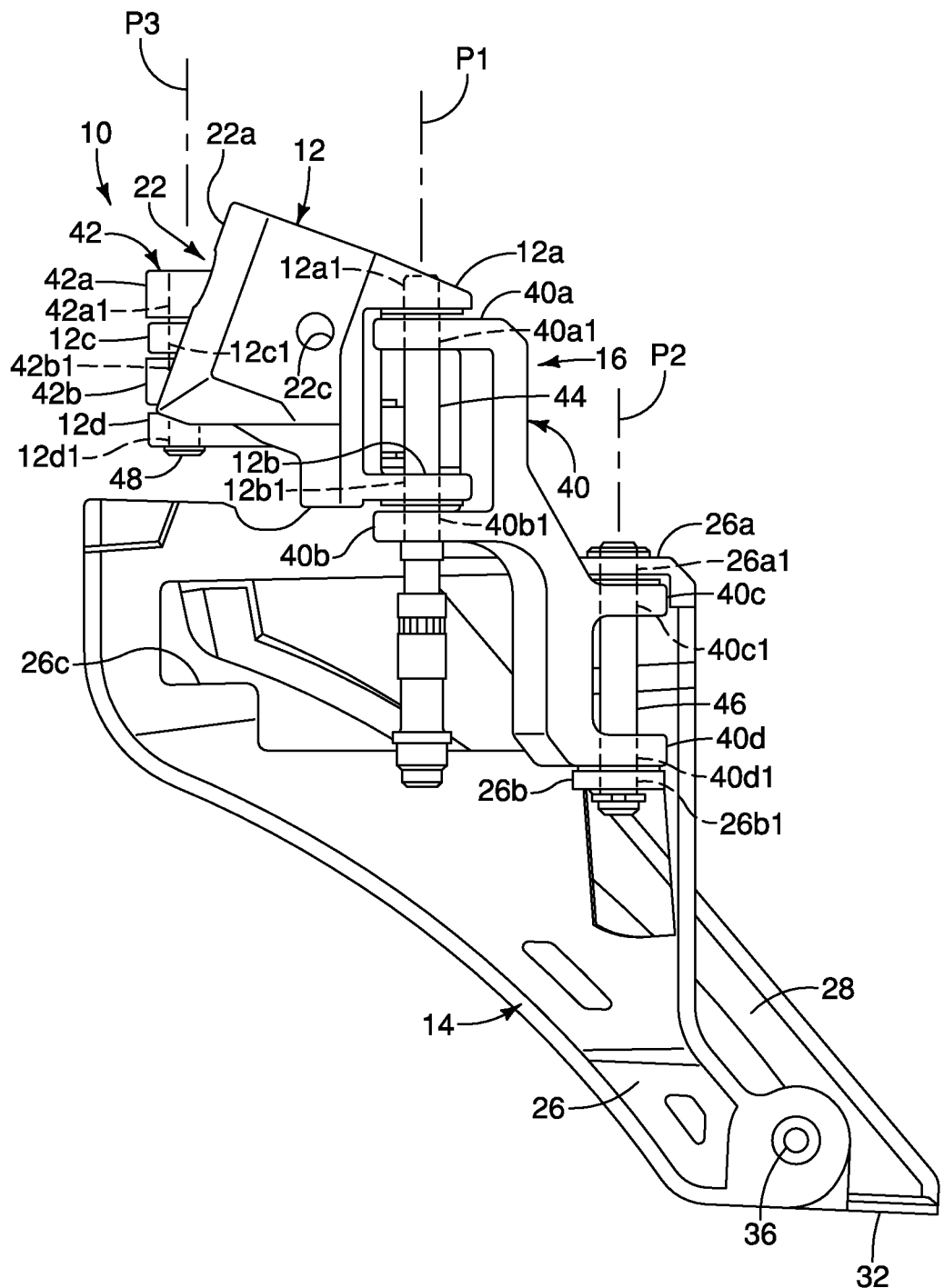
FIG. 12 is an enlarged inner side elevational view of the electric front derailleur illustrated in FIG. 11 with the electric motor unit removed.
Figure 13:
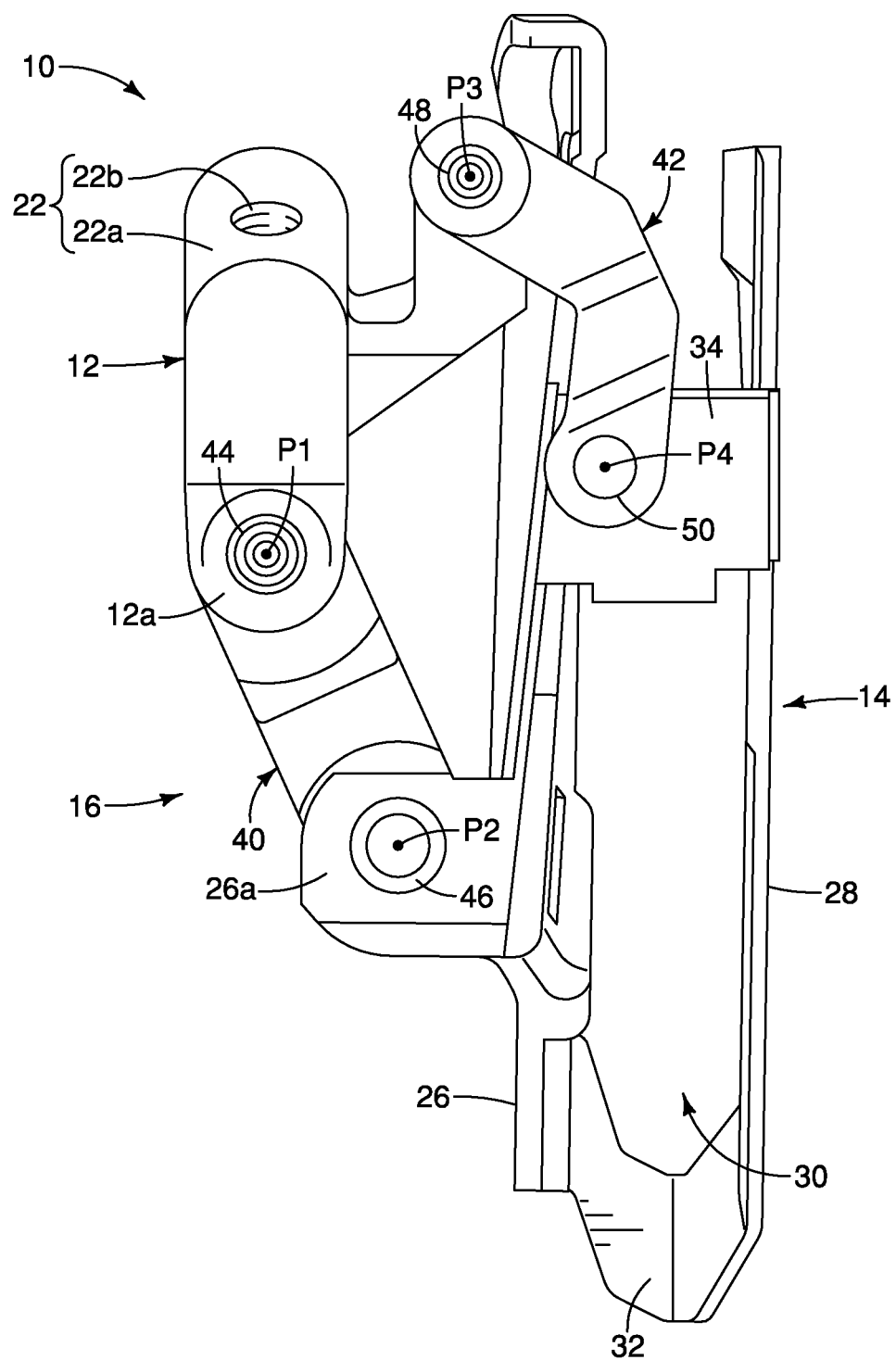
FIG. 13 is an enlarged top elevational view of the electric front derailleur illustrated in FIGS. 11 and 12 with the electric motor unit removed.

Specifically, referring to FIG. 10, the first link 40 is pivotally connected to the base 12 around a first pivot axle 44. More specifically, the first link 40 has a first link support 40a and a second link support 40b. The first link support 40a and the second link support 40b are fixedly coupled to the first pivot axle 44. Here, the first link support 40a includes a first opening 40a1 for receiving the first pivot axle 44 and the second link support 40b includes a second opening 40b1 for receiving the first pivot axle 44. One or both of the first and second openings 40a1 and 40b1 are splined bores that engage corresponding splines on the first pivot axle 44 so that the first link 40 is non-rotatably fixed to the first pivot axle 44. Preferably, as in the exemplary embodiment, both of the first and second openings 40a1 and 40b1 are splined bores that engage corresponding splines on the first pivot axle 44. In any case, here, the first pivot axle 44 is fixedly coupled to the first link 40. Thus, the first link 40 and the first pivot axle 44 pivot together as a unit with respect to the base 12.

The first base support 12a preferably includes a first base pivot opening 12a1 for receiving the first pivot axle 44, and the second base support 12b preferably includes a second base pivot opening 12b1 for receiving the first pivot axle 44. In this way, the first pivot axle 44 is pivotally supported with respect to the base 12. Since the first link 40 is fixed to the first pivot axle 44, the first link 40 and the first pivot axle 44 pivot together as a unit with respect to the base 12.

In the exemplary embodiment, the first and second base supports 12a and 12b are vertically spaced apart in the mounted state, and the first and second link supports 40a and 40b are vertically spaced apart in the mounted state. In this way, a wide pivot connection is made between the first link 40 and the base 12. Here, the first base support 12a is located above the first link support 40a in the mounted state. Also, here, the second base support 12b is located above the second link support 40b in the mounted state.

Also, referring to FIG. 8, the first link 40 is pivotally connected to the chain guide 14 around a second pivot axle 46. More specifically, the first link 40 has a third link support 40c and a fourth link support 40d. The third link support 40c and the fourth link support 40d are pivotally coupled to the second pivot axle 46. Here, the third link support 40c includes a third opening 40c1 for pivotally receiving the second pivot axle 46 and the fourth link support 40d includes a fourth opening 40d1 for pivotally receiving the second pivot axle 46. The inner guide plate 26 has a first support flange 26a and a second support flange 26b for pivotally attaching the chain guide 14 to the first link 40. More specifically, the first support flange 26a includes a pivot opening 26a1 for pivotally receiving the second pivot axle 46 and the second support flange 26b includes a pivot opening 26b1 for pivotally receiving the second pivot axle 46. In this way, an upstream end of the chain guide 14 is pivotally coupled to the first link 40.

In the exemplary embodiment, the third and fourth link supports 40c and 40d are vertically spaced apart in the mounted state, and the first and second support flanges 26a and 26b are vertically spaced apart in the mounted state. In this way, a wide pivot connection is made between the first link 40 and the chain guide 14. Here, the first support flange 26a is located above the third link support 40c in the mounted state. On the other hand, here, the second support flange 26b is located below the fourth link support 40d in the mounted state.

Referring to FIG. 2, the second link 42 is pivotally connected to the base 12 around a third pivot axle 48. More specifically, the third base support 12c includes a third base pivot opening 12c1 for receiving the third pivot axle 48, and the fourth base support 12d includes a fourth base pivot opening 12d1 for receiving the third pivot axle 48. In this way, the third pivot axle 48 is pivotally supported with respect to the base 12. The second link 42 has a third link support 42a and a fourth link support 42b. The third link support 42a includes a third opening 42a1 for receiving the third pivot axle 48 and the fourth link support 42b includes a fourth opening 42b1 for receiving the third pivot axle 48. In this way, the second link 42 is pivotally supported on the third pivot axle 48 to pivot with respect to the base 12. In the exemplary embodiment, the third link support 42a is located above the third base support 12c. Similarly, the fourth link support 42b is located above the fourth base support 12d in the mounted state. The third pivot axle 48 is offset from the first pivot axle 44 as viewed in a parallel to the chain driving direction CD as seen in FIG. 2.

Referring to FIG. 2, the second link 42 is pivotally connected to the chain guide 14 around a fourth pivot axle 50. More specifically, the second link 42 has a fifth link support 42c. The fifth link support 42c is pivotally coupled to the fourth pivot axle 50. Here, the fifth link support 42c includes a fifth opening 42c1 for pivotally receiving the fourth pivot axle 50. The fourth pivot axle 50 is fixed to the downstream connecting part 34 of the chain guide 14. In this way, a downstream end of the chain guide 14 is pivotally coupled to the second link 42. The fourth pivot axle 50 is offset from the second pivot axle 46 as viewed in a parallel to the chain driving direction CD as seen in FIG. 2.

With this arrangement, a four-bar linkage is defined by the first and second links 40 and 42 being connected between the base 12 and the chain guide 14. Also, with the arrangement of the first and second links 40 and 42, the movement of the chain guide 14 is in a generally horizontal plane such that the chain guide 14 swings in a forward and rear direction with respect to the bicycle frame F as the chain guide 14 swings laterally with respect to the bicycle frame F between the extended position (see FIGS. 3 and 4) and the retracted position (see FIGS. 5 and 6).

The first pivot axle 44 is located rearward of the third pivot axle 48 in the mounted state as view in a direction parallel to a pivot axis P1 of the first pivot axle 44. The second pivot axle 46 is located rearward of the fourth pivot axle 50 in the mounted state as view in a direction parallel to a pivot axis P2 of the second pivot axle 46. The third pivot axle 48 is located forward of the fourth pivot axle 50 in the mounted state as view in a direction parallel to a pivot axis P3 of the third pivot axle 48. The fourth pivot axle 50 is located forward of the first pivot axle 44 in the mounted state as view in a direction parallel to a pivot axis P4 of the fourth pivot axle 50. Thus, the first link 40 is disposed closer to the bicycle frame 1 than the second link 42 in the mounted state. Also, with this arrangement, as the chain guide 14 moves between the extended position (see FIGS. 3 and 4) and the retracted position (see FIGS. 5 and 6), the second and fourth pivot axles 46 and 40 moves in a forward-rearward direction where the base 12 is mounted to the bicycle frame F.

Now, the electric motor unit 18 will be discussed in more detail. Preferably, as in the exemplary embodiment, as seen in FIGS. 3, 4, 6 and 7, the electric motor unit 18 is arranged at least partly closer to the bicycle frame F of the bicycle B than the chain guide 14. Specifically, the electric motor unit 18 is arranged at least partially closer to a pipe portion of the bicycle frame F in than the chain guide 14. Also, as seen in FIGS. 3, 4, 6 and 7, the electric motor unit 18 is at least partly arranged between the chain guide 14 and the bicycle B as seen in a direction perpendicular to the guiding direction GD. Specifically, the electric motor unit 18 is at least partially arranged between the chain guide 14 and the pipe portion of the bicycle frame F as seen in the direction perpendicular to the guiding direction GD. Moreover, as seen in FIGS. 2, 9 and 10, the electric motor unit 18 is arranged so as to at least partly overlap with the chain guide 14 while the chain guide 14 is in the retracted position as viewed in the guiding direction GD. Further, the bicycle mounting structure 22 is at least partly located above the electric motor unit 18 in the mounted state.

Figure 14:
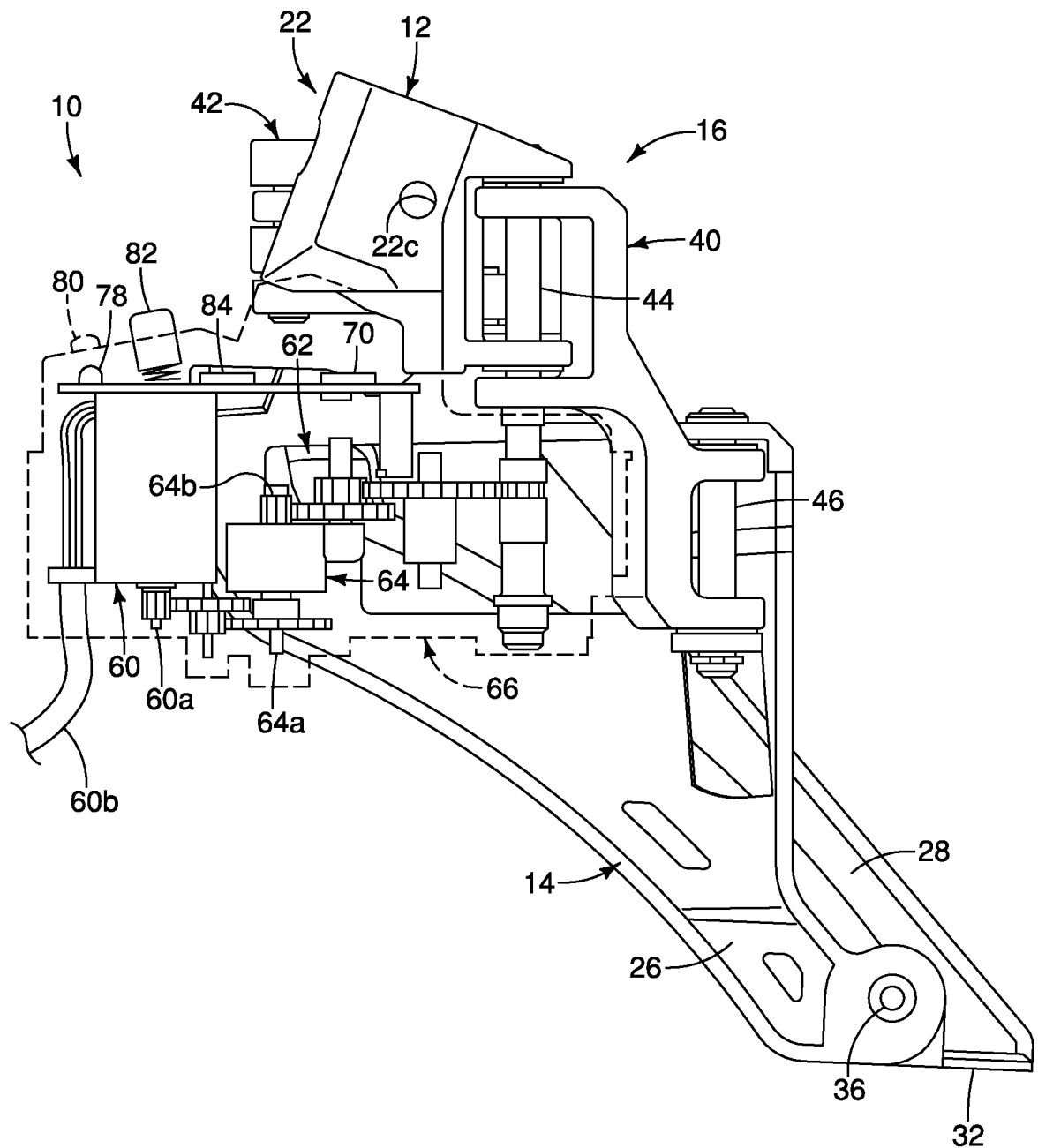
FIG. 14 is an enlarged inner side elevational view, similar to FIG. 8, of the electric front derailleur illustrated in FIGS. 1 to 8, but with a motor unit housing of the electric motor unit removed for purposes of illustration.
Figure 15:
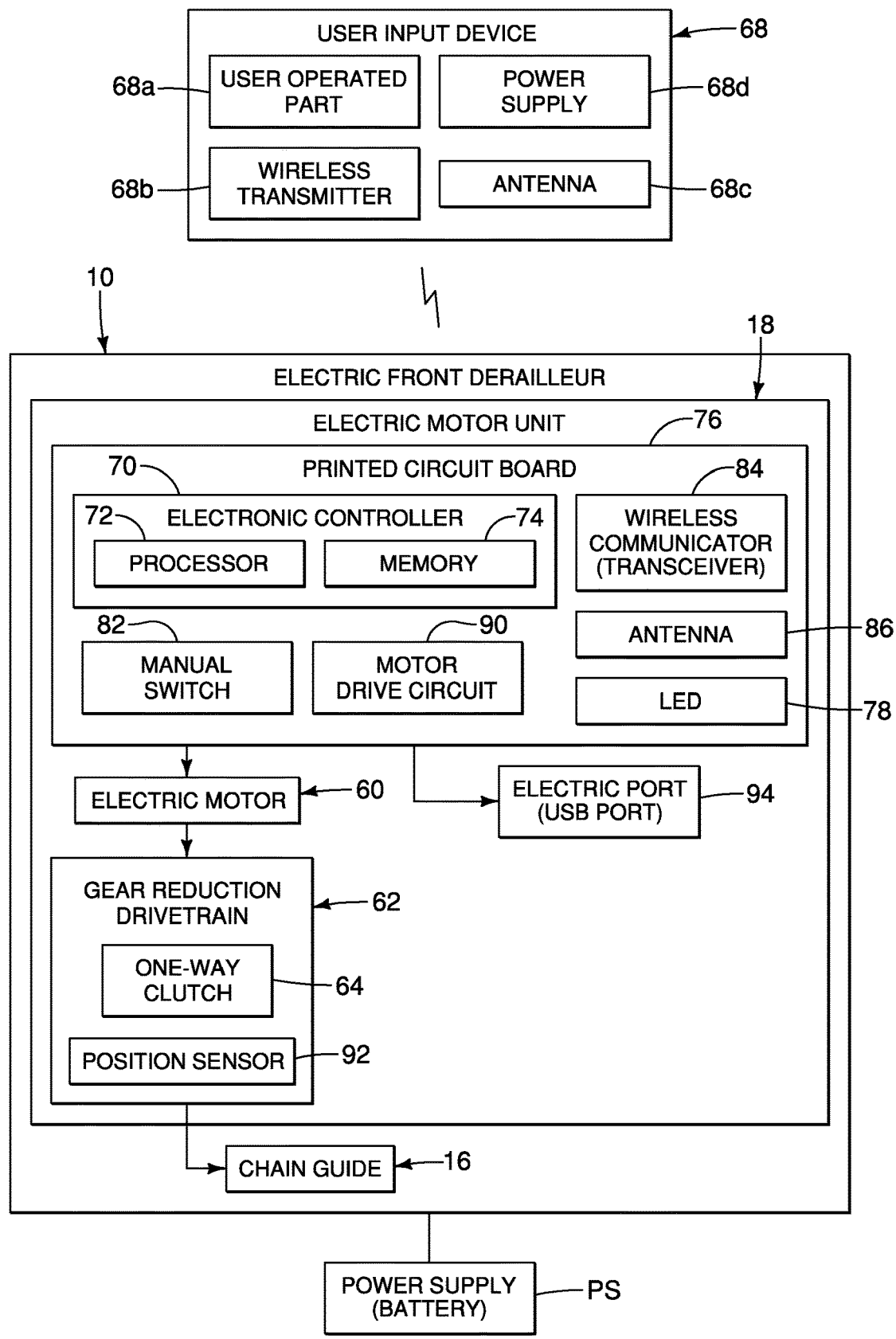
FIG. 15 is a block diagram schematically illustrating the electric front derailleur illustrated in FIGS. 1 to 14.

Referring to FIGS. 14 and 15, the electric motor unit 18 includes an electric motor 60. As seen in FIG. 15, the electric motor 60 is electrically connected to a power supply PS (e.g., one or more batteries) to receive electrical power. Preferably, as in the exemplary embodiment, the bicycle mounting structure 22 is located above the electric motor 60. The electric motor 60 is a reversible electric motor that is operatively coupled to the first pivot axle 44 to selectively rotate the first pivot axle 44. In particular, the first pivot axle 44 is operatively connected to the electric motor to directly rotate the first link 40 in response to operation of the electric motor 60. The electric motor 60 is operated in a first operating direction to rotate the first link 40 and the first pivot axle 44 in a first rotation direction to move the chain guide 14 from the extended position to the retracted position. The electric motor 60 is operated in a second operating direction to rotate the first link 40 and the first pivot axle 44 in a second rotation direction to move the chain guide 14 from the retracted position to the extended position. The first rotational direction is opposite the second rotational direction.

Here, the electric front derailleur 10 further comprises a gear reduction drivetrain 62 that operatively couples the electric motor 60 to the first pivot axle 44. The gear reduction drivetrain 62 includes a plurality of gears that are meshed together to reduce an output speed of the electric motor 60 and increase torque output from the electric motor 60 to move the chain guide 14. Since gear reduction drivetrains are conventional, the gear reduction drivetrain 62 will not be discussed in detail herein.

Also, preferably, the electric front derailleur 10 further comprises an anti-reverse input clutch 64 that is operatively disposed between an output shaft 60a of the electric motor 60 and the first pivot axle 44. Here, the anti-reverse input clutch 64 is disposed in the gear reduction drivetrain 62. The anti-reverse input clutch 64 has an input shaft 64a and an output shaft 64b. The anti-reverse input clutch 64 is configured such that a rotational torque applied to the input shaft 64a causes the output shaft 64b to rotate in the same direction as the input shaft 64a is rotated. However, the anti-reverse input clutch 64 is further configured such that a rotational torque applied to the output shaft 64b is not transmitted to the input shaft 64a. The input shaft 64a is capable of bi-directional rotation that is transmitted to the anti-reverse input clutch 64 such that the anti-reverse input clutch 64 can be rotated in both rotational directions. The anti-reverse input clutch 64 can be, for example, a torque diode. The term "torque diode" is defined as a reverse input blocking mechanical clutch that transmits rotational torque from the input shaft to the output shaft but does not transmits rotational torque from the output shaft to the input shaft. The reverse input blocking mechanical clutch is categorized in to two types (i.e., "a free rotation type" and "a locked rotation type"). In the free rotation type, the output shaft of the reverse input blocking mechanical clutch (torque diode) turns freely and does not transmit a rotational torque to the input shaft when the rotational torque is applied to the output shaft. On the other hand, in the locked rotation type, the output shaft of the reverse input blocking mechanical clutch (torque diode) does not turn and does not transmit a rotational torque to the input shaft when the rotational torque is applied to the output shaft. Here, the anti-reverse input clutch 64 is preferably a free rotation type torque diode. However, the anti-reverse input clutch 64 can be a locked rotation type torque diode. Examples of suitable anti-reverse input clutches are disclosed in U.S. Pat. No. 7,607,526.

Figure 7:
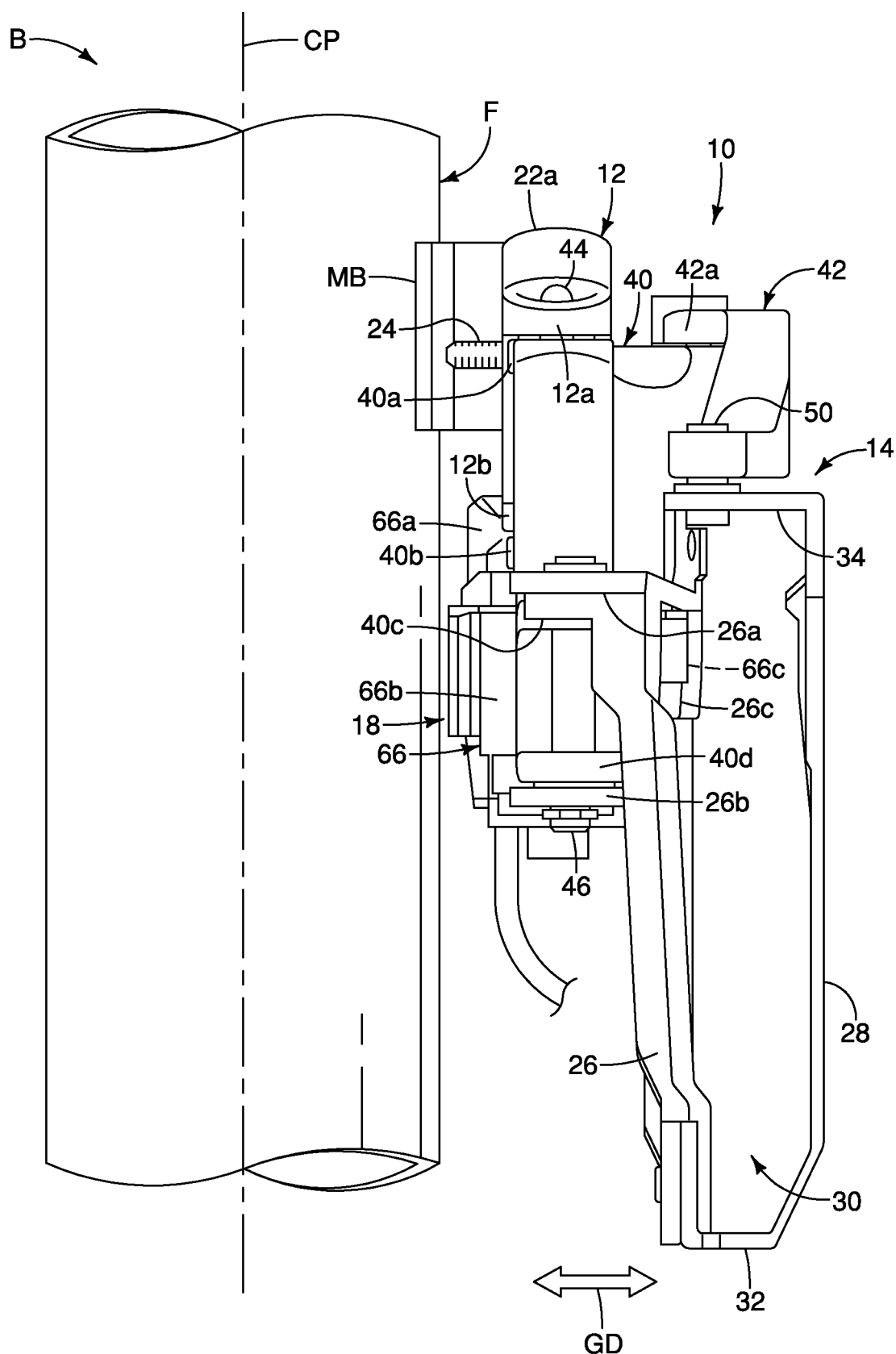
FIG. 7 is an enlarged rear elevational view of the electric front derailleur illustrated in FIGS. 1 to 6 with the chain guide in the retracted position with respect to the base.

Preferably, as in the exemplary embodiment, the electric motor unit 18 includes a motor unit housing 66 that is supported on the base 12. Also, preferably, the motor unit housing 66 is at least partly located frontward of the bicycle mounting structure 22 in the mounted state. The motor unit housing 66 is secured to the base 12 using conventional fastening techniques. For example, the motor unit housing 66 can be bonded to the base 12 or bolted to the base 12. Here, the motor unit housing 66 includes a first housing part 66a and a second housing part 66b. The first housing part 66a and the second housing part 66b are fixed together to form an interior space for housing at least the electric motor 60, the gear reduction drivetrain 62 and the anti-reverse input clutch 64. The first housing part 66a and the second housing part 66b can be made of a suitable rigid material, such as a metallic material or a plastic reinforced material. As seen in FIGS. 7 and 8, the inner guide plate 26 has an opening 26c that receives a portion 66c of the motor unit housing 66 while the chain guide 14 is in the retracted position.

As diagrammatically illustrated in FIG. 15, the electric front derailleur 10 is controlled by a user input device 68. Here, the user input device 68 wirelessly communicates with the electric front derailleur 10. The wireless communication signals can be radio frequency (RF) signals, ultra-wide band communication signals, or Bluetooth® communications or any other type of signal suitable for wireless communications as understood in the bicycle field. However, alternatively, the electric front derailleur 10 can be connected to the user input device 68 by a wire (directly or indirectly). In such a case, the user input device 68 can communicate via a dedicated signal wire or via power line communications (PLC). In the exemplary embodiment, the user input device 68 has a user operated part 68a (e.g., one or more buttons, one or more levers, a touch screen, etc.), a wireless transmitter 68b, an antenna 68c and a power supply 68d. When a user operates the user input device 68, the wireless transmitter 68b transmits a wireless signal to the electric front derailleur 10. Here, the wireless transmitter 68b can be a one-way wireless communicator that merely transmits shift signals in response to the operation of the user operated part 68a. However, alternatively, the wireless transmitter 68b can be a two-way wireless communicator such as a transceiver that receives and transmits shift signals and other data.

Preferably, as in the exemplary embodiment, as diagrammatically shown in FIG. 15, the electric motor unit 18 further includes an electronic controller 70. The electronic controller 70 is preferably a microcomputer that includes at least one processor 72 and memory 74 (at least one computer storage device). The electronic controller 70 is formed of one or more semiconductor chips that are mounted on a printed circuit board 76. The term "electronic controller" as used herein refers to hardware that executes a software program, and does not include a human. The memory 74 is any computer storage device or any non-transitory computer-readable medium with the sole exception of a transitory, propagating signal. For example, the memory 74 can include nonvolatile memory and volatile memory, and can includes a ROM (Read Only Memory) device and/or a RAM (Random Access Memory) device. The memory 74 is configured to store settings, programs, data, calculations and/or results of the processor 72.

Preferably, as in the exemplary embodiment, the electric front derailleur 10 further comprises an indicator 78 that is configured to indicate a status of the electric motor unit 18. Here, the indicator 78 is a light emitting diode (LED) that is provided on the printed circuit board 76 and is visible through a window 80 that is provided to the motor unit housing 66. In this way, the indicator 78 is visible to show an operating status of the electric motor unit 18. For example, the indicator 78 can be blinking if the electric motor 60 of the electric motor unit 18 is malfunction and can be a steady and continuous if the electric motor 60 of the electric motor unit 18 is operating properly. The indicator 78 can also be used for other purposes such as for setting certain functions.

Preferably, as in the exemplary embodiment, the electric front derailleur 10 further comprises a manual switch 82 that is operatively connected to the electric motor unit 18 to drive the electric motor unit 18. Here, the manual switch 82 is a press type switch that is provided on the printed circuit board 76 and protrudes through an opening in the motor unit housing 66. When a user presses the manual switch 82, the electronic controller 70 operates the electric motor 60 to drive the electric motor 60 to move the chain guide 14 towards the retracted position. Alternatively, the electronic controller 70 can be configured such that when a user presses the manual switch 82, the electronic controller 70 operates the electric motor 60 to drive the electric motor 60 to move the chain guide 14 towards the extended position. Moreover, the electronic controller 70 can be configured such that when a user presses the manual switch 82 in a predetermined manner, the electronic controller 70 controller other features of the electric front derailleur 10 such as calibration of the "high" and "low" positions of the chain guide 14.

Preferably, as in the exemplary embodiment, the electric front derailleur 10 further comprises a wireless communicator 84 that is operatively connected to the electric motor unit 18. Here, the wireless communicator 84 is provided on the printed circuit board 76. The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth® communications or any other type of signal suitable for wireless communications as understood in the bicycle field. Here, the wireless communicator 84 can be a one-way wireless communicator such as a receiver that receives shift signals. However, alternatively, the wireless communicator 84 can be a two-way wireless communicator such as a transceiver that receives shift signals and sends data.

The wireless communicator 84 receives the wireless shift signals from the wireless transmitter 68b of the user input device 68. In response receiving a wireless shift signal, the electronic controller 70 activates the electric motor 60 via a motor drive circuit 90 that is provided on the printed circuit board 76. Preferably, a position sensor 92 is provided to the gear reduction drivetrain 62 for detecting the output of the electric motor 60 so that the electronic controller 70 can determine the position of the chain guide 14. Motor (actuator) drive circuits and position sensors are well known in the bicycle field, and thus, the motor drive circuit 90 and the position sensor 92 will not be discussed herein.

Preferably, as in the exemplary embodiment, the electric motor unit 18 includes an electrical port 94 configured to be coupled to other devices. In this way, other devices can be electrically connected to the electronic controller 70 of the electric front derailleur 10. For example, an external device such as a smartphone, a tablet, and a laptop personal computer can be connected to the electric front derailleur 10 via the electrical port 94 to perform updates and/or calibrations. Moreover, a remote bicycle component (e.g., a rear derailleur of the bicycle B) can be connected to the electric front derailleur 10 via the electrical port 94 such that the remote bicycle component can be synchronized with the electric front derailleur 10. Further, a remote wireless communicator can be coupled to the electric motor unit 18 via the electrical port 94 as disclosed in U.S. Pat. No. 10,086,907. While the electrical port 94 is a USB port in the exemplary embodiment, the electrical port 94 can have other configurations such as a DIN connector.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the electric front derailleur. Accordingly, these directional terms, as utilized to describe the electric front derailleur should be interpreted relative to a bicycle in an upright riding position on a horizontal surface and that is equipped with the electric front derailleur. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric front derailleur comprising:
   a base configured to be mounted to a bicycle;
   a chain guide configured to guide a chain;
   a linkage movably coupling the chain guide to the base in a forward-rearward direction to move the chain guide between a retracted position and an extended position in a mounted state where the base is mounted to the bicycle, the linkage including at least one pivot axle that is oriented in a vertical direction of the bicycle in the mounted state; and
   an electric motor unit supported on the base and operatively coupled to the linkage to move the chain guide between the retracted position and the extended position, the electric motor unit being arranged at least partly closer to a bicycle frame of the bicycle than the chain guide.

2. The electric front derailleur according to claim 1, wherein
   the base includes a bicycle mounting structure at least partly located above the electric motor unit in the mounted state.

3. The electric front derailleur according to claim 1, wherein
   the base includes a bicycle mounting structure, and
   the electric motor unit includes a motor unit housing supported on the base such that the motor unit housing is at least partly located frontward of the bicycle mounting structure in the mounted state.

4. The electric front derailleur according to claim 1, wherein
   the electric motor unit includes an electric motor, and the linkage includes a first link pivotally connected to the base around a first pivot axle and pivotally connected to the chain guide around a second pivot axle, the first pivot axle is fixedly coupled to the first link and operatively connected to the electric motor to directly rotate the first link in response to operation of the electric motor.

5. The electric front derailleur according to claim 4, wherein
the base has a first base support that includes a first base pivot opening receiving the first pivot axle and a second base support that includes a second base pivot opening receiving the first pivot axle, and
the first link has a first link support that includes a first opening receiving the first pivot axle and a second link support that includes a second opening receiving the first pivot axle, the first base support is located above the first link support, and the second base support is located above the second link support in the mounted state.

6. The electric front derailleur according to claim 4, wherein
the linkage includes a second link pivotally connected to the base around a third pivot axle and pivotally connected to the chain guide around a fourth pivot axle.

7. The electric front derailleur according to claim 6, wherein
the base has a third base support that includes a third base pivot opening receiving the third pivot axle and a fourth base support that includes a fourth base pivot opening receiving the third pivot axle, and
the second link has a third link support that includes a third opening receiving the third pivot axle and a fourth link support that includes a fourth opening receiving the third pivot axle, the third link support is located above the third base support, and the fourth link support is located above the fourth base support in the mounted state.

8. The electric front derailleur according to claim 6, wherein
the first pivot axle is located rearward of the third pivot axle in the mounted state as view in a direction parallel to a pivot axis of the first pivot axle.

9. The electric front derailleur according to claim 6, wherein
the second pivot axle is located rearward of the fourth pivot axle in the mounted state as view in a direction parallel to a pivot axis of the second pivot axle.

10. The electric front derailleur according to claim 6, wherein
the fourth pivot axle is located forward of the first pivot axle in the mounted state as view in a direction parallel to a pivot axis of the fourth pivot axle.

11. The electric front derailleur according to claim 4, further comprising
an anti-reverse input clutch operatively disposed between an output shaft of the electric motor and the first pivot axle.

12. The electric front derailleur according to claim 4, further comprising
a gear reduction drivetrain operatively coupling the electric motor to the first pivot axle.

13. The electric front derailleur according to claim 1, further comprising
an indicator configured to indicate a status of the electric motor unit.

14. The electric front derailleur according to claim 1, further comprising
a manual switch operatively connected to the electric motor unit to drive the electric motor unit.

15. The electric front derailleur according to claim 1, further comprising
a wireless communicator operatively connected to the electric motor unit.

16. The electric front derailleur according to claim 1, wherein
the electric motor unit includes an electrical port configured to be coupled to other devices.

17. An electric front derailleur comprising:
a base configured to be mounted to a bicycle;
a chain guide including an inner guide plate and an outer guide plate, the inner guide plate and the outer guide plate being arranged along a guiding direction;
a linkage movably coupling the chain guide to the base to move the chain guide between a retracted position and an extended position; and
an electric motor unit supported on the base and operatively coupled to the linkage to move the chain guide between the retracted position and the extended position, the electric motor unit being arranged so as to at least partly overlap with the chain guide while the chain guide is in the retracted position as viewed in the guiding direction.

18. The electric front derailleur according to claim 17, wherein
the linkage is configured to move the chain guide in a forward-rearward direction with respect to the base in a mounted state where the base is mounted to the bicycle in a mounted state.

19. The electric front derailleur according to claim 17, wherein
the electric motor unit is at least partly arranged between the chain guide and the bicycle as seen in a direction perpendicular to the guiding direction.

20. An electric front derailleur comprising:
a base configured to be mounted to a bicycle;
a chain guide configured to guide a chain;
a linkage movably coupling the chain guide to the base in a forward-rearward direction to move the chain guide between a retracted position and an extended position in a mounted state where the base is mounted to the bicycle; and
an electric motor unit supported on the base and operatively coupled to the linkage to move the chain guide between the retracted position and the extended position, the electric motor unit being arranged at least partly closer to a bicycle frame of the bicycle than the chain guide,
the electric motor unit including a motor unit housing that is supported on the base, and
the chain guide including an inner guide plate and an outer guide plate, the inner guide plate has an opening that receives a portion of the motor unit housing while the chain guide is in the retracted position.

* * * * *